C. Pratt.
Can Nozzle.
No. 3,762. Reissued Dec. 14, 1869.
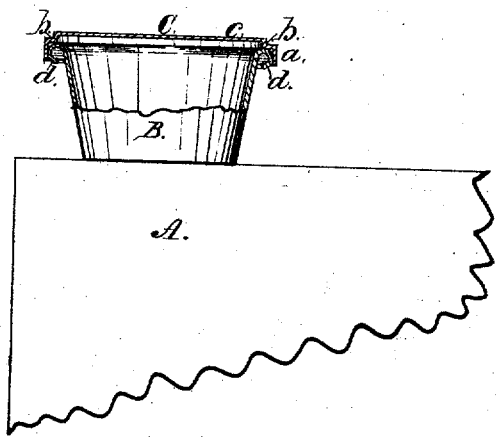
Witnesses:
A. A. Ellsworth
Nathan R. Ellsworth.
Inventor:
Charles Pratt
by Munn & Co
attys
N. PETERS, PHOTO-LITHOGRAPHER, WASHINGTON, D. C.

UNITED STATES PATENT OFFICE.

CHARLES PRATT, OF NEW YORK, N. Y.

IMPROVEMENT IN NOZZLES FOR CANS.

Specification forming part of Letters Patent No. 89,167, dated April 20, 1869; Reissue No. 3,762, dated December 14, 1869.

*To all whom it may concern:*

Be it known that I, CHARLES PRATT, of the city, county, and State of New York, have invented certain new and useful Improvements in Nozzles for Sheet-Metal Cans; and I hereby declare the following to be a full, clear, and exact description of the same, reference being had to the accompanying drawing, which represents a side elevation, partly in section, of a nozzle made in accordance with my invention.

It has heretofore been customary to seal the mouths, discharge-openings, or nozzles of sheet-metal cans by means of a cork or other device placed over the mouth or in the nozzle of the can, and then covered with sealing-wax, upon which a seal or stamp indicating the name of the manufacturer or dealer and the character of the oil was impressed. This mode of sealing the cans is expensive and troublesome, and, moreover, when the mouth or nozzle is opened, by removing the seal, no trace of the latter is left by which the character or quality of oil may be ascertained. Neither does this mode furnish any marks by which superior oils, or oils of any given quality, when packed in cans and in the market, may be distinguished from inferior oils or oils of other quality.

My invention is designed to obviate these difficulties; and it consists—

First, in a combined nozzle and seal, or a nozzle of suitable construction having soldered or otherwise secured to its outer end a soft-metal cap, as a new manufacture. A combined nozzle and cap thus formed can be placed in the market independently of the can, as a seal for cans or vessels containing any fluids. When used, it only requires to be soldered or otherwise suitably secured over the opening which it is desired to close, and then the cap will hermetically close the vessel against the escape of the fluid. The nozzle, being of heavier metal and of considerable strength, can safely be placed upon the exterior of the can, and when the fluid is to be poured out from the can through the nozzle, the cap, being made of soft and thin metal, can be easily cut away, so as to leave the mouth of the nozzle wholly uncovered.

Secondly, in the combination of the nozzle with a soft-metal cap which covers the mouth of the nozzle and extends down over the sides or over a bead formed around the outer end of the same a sufficient distance to admit of the cap being soldered to the nozzle at a point below the mouth of the latter. When the parts are thus combined the cap can be cut away so as to leave the mouth of the nozzle open and unobstructed, and smooth, the soldered portion of the cap, which it would be difficult, if not impossible, to cut through with ordinary instrumentalities, being entirely below the mouth of the nozzle and removed from the path of the knife or other cutting-instrument. The flange or annulus of soft metal, which is thus left around the nozzle, after that part of the cap which covers the mouth has been removed, serves, moreover, as a means for marking the quality of oil contained in the can.

Thirdly, in the combination, with a nozzle for oil-cans, of a soft-metal cap applied to the mouth of the nozzle, as above specified, and having formed upon it a ridge or cutting-shoulder of annular or other shape corresponding with that of the mouth, said shoulder constituting a guide for the knife or other cutting-instrument employed to remove the cap. The knife follows the shoulder, and, as the latter has the size and shape of the mouth, it is a sure guide for the knife, which is thus caused to accurately cut away all that portion of the cap which, if left, would impede or obstruct the flow of the liquid when poured out from the can, or would prevent the ready insertion of a cork or other stopper for the nozzle.

In the drawing, B is the nozzle, made in any ordinary or suitable shape, with its upper edge turned over and wired in the usual manner. It is formed of tin or other sheet metal, and can be applied to any metallic can or vessel, A, for containing liquids, being secured over the opening or aperture in the same by means of solder or equivalent means.

For the purpose of facilitating the attachment of the nozzle it may, if desired, be provided at the end which is secured to the can with a flange or shoulder, so that the soldering operation may be more easily effected.

Over the mouth of the nozzle is soldered or otherwise secured, so as to hermetically close the same, a sheet-metal cap, C, made of thin, soft metal, which can be readily penetrated and cut away by a knife or other suitable instrument, so as to uncover the mouth of the nozzle whenever desired.

A combined nozzle and soft-metal seal such as I have described can be put into the market independently of the can, and as a distinct article of manufacture. It does not require that the opening in the can should accurately correspond to it in shape and size, as is the case where a screw-nozzle is used, for even if the opening be smaller the base of the nozzle can be readily applied and soldered to the can around the opening. The soft-metal cap will seal the opening, and can be cut away when it is desired to pour out from the can whatever liquid it may contain.

For the purpose of carrying into effect the above-stated second and third features of my invention, I prefer to strike up the soft-metal cap C with a curved edge or flange, *a*, and with a narrow shoulder, *b*, between said flange and the top *c*. If desired, the quality of the article contained in the can, or the name of the dealer, or both, may be stamped upon the top *c*. The cap C is applied to the nozzle by fitting the curved flange *a* over the bead *d* of the nozzle and soldering it in place. The flange must extend sufficiently down upon the bead to remove the solder from the shoulder *a*, and to leave the bead with a smooth upper surface when the cap is removed. This is accomplished by cutting with a knife or other sharp instrument along the shoulder *a*, the bead *d* furnishing a guide and bearing-surface for the knife. It will be observed that the point of soldering is so far below the shoulder *a* that only the soft metal of the cap will be encountered by the knife, and that therefore the cutting operation can be performed with the utmost ease and expedition. If desired, however, the cutting-shoulder may be dispensed with and the top of the cap made smooth, though for the reasons above given I usually prefer the construction just described.

By the removal of the cap in this manner the flange is left upon the nozzle as a means for identifying the quality of oil contained in the can, and is so far below the upper surface of the bead *d* as to allow unobstructed passage for the oil in being poured from the can, and so as not to interfere with the introduction of a cork to the nozzle.

The combined nozzle and seal thus made is simple in construction, easily applied to cans, and satisfies a need long felt in the market.

Having thus described my invention, what I claim as new, and desire to secure by Letters Patent, is—

1. As a new article of manufacture, a combined nozzle and seal for cans, composed of a metallic nozzle, in combination with a cap of thin soft metal applied and secured to the same, substantially as herein described.

2. The combination, with a nozzle for cans, of a soft-metal cap covering the mouth of the nozzle, and extending down upon the sides of the same a sufficient distance to admit of the cap being soldered to the nozzle at a point removed from or below its mouth, substantially as and for the purposes set forth.

3. The formation upon the soft-metal cap which covers the mouth of the nozzle of a shoulder or ridge for the guidance of the cutting instrument, as shown and set forth.

In testimony whereof I have hereunto set my hand in the presence of two subscribing witnesses.

CHAS. PRATT.

Witnesses:
SAM. JOHN STORRS,
M. BAILEY.